(12) United States Patent
Kuo et al.

(10) Patent No.: US 6,334,372 B2
(45) Date of Patent: *Jan. 1, 2002

(54) VIBRATION-REDUCING DEVICE FOR HIGH-SPEED ROTATIONAL BODY

(75) Inventors: Lih-Hwa Kuo; Jenn-Shing Tsai, both of Hsinchu (TW)

(73) Assignee: Lite-On Technology Corp., Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,840

(22) Filed: Apr. 2, 1999

(51) Int. Cl.[7] .......................... F16F 15/10; G11B 5/012
(52) U.S. Cl. .................... 74/574; 74/573 R; 360/97.01; 360/114
(58) Field of Search ...... 74/572–574; 360/98.01–98.08, 360/114, 97.01, 104, 108; 369/77.1

(56) References Cited

U.S. PATENT DOCUMENTS

| | | | |
|---|---|---|---|
| 3,854,347 A | * 12/1974 | Hellerich | 74/573 |
| 4,491,888 A | * 1/1985 | Brown et al. | 360/97 |
| 4,598,328 A | * 7/1986 | Frangesh | 360/97 |
| 4,683,505 A | * 7/1987 | Schmidt et al. | 360/98 |
| 5,130,870 A | * 7/1992 | Jabbari | 360/99.08 |
| 5,167,167 A | * 12/1992 | Tiernan et al. | 74/572 X |
| 5,249,090 A | * 9/1993 | Fehse | 360/98.08 |
| 5,422,776 A | * 6/1995 | Thorson et al. | 360/98.07 |
| 5,555,144 A | * 9/1996 | Wood et al. | 74/573 R X |
| 5,598,306 A | * 1/1997 | Frees et al. | 360/97.02 |
| 5,864,529 A | * 1/1999 | Liao et al. | 369/77.1 |
| 5,907,452 A | * 5/1999 | Kan | 360/97.01 |
| 5,999,374 A | * 12/1999 | Kim | 360/106 |
| 6,031,693 A | * 2/2000 | Takahashi et al. | 360/114 |
| 6,256,165 B1 | * 7/2001 | Kim | 360/97.01 |

FOREIGN PATENT DOCUMENTS

| | | | |
|---|---|---|---|
| JP | 57-92469 | * | 6/1982 |
| JP | 62-112273 | * | 5/1987 |
| JP | 63-90061 | * | 4/1988 |

* cited by examiner

*Primary Examiner*—Vinh T. Luong
(74) *Attorney, Agent, or Firm*—Rosenberg, Klein & Lee

(57) ABSTRACT

A vibration-reduced disk drive system is provided. The disk drive system comprises a reading device having a mechanism for high speed rotation of a data storage disk, and a weight body disposed adjacent to the reading device. The disk drive system also comprises at least one hanging device formed of a metallic material that joins the reading device and the weight body for transferring vibration therebetween. The disk drive system thus effects vibration dampening for the reading device and its housing, so as to preserve the stability of access to the data stored on the given data storage disk.

8 Claims, 4 Drawing Sheets

VIBRATION-REDUCING DEVICE FOR HIGH-SPEED ROTATIONAL BODY

FIELD OF THE INVENTION

The present invention relates to a vibration-reducing device for high-speed rotational body, more particularly, to a vibration-reducing device, by which the data reading/writing device such as CDROM has less vibration and better data accessing stability.

BACKGROUND OF THE INVENTION

As the accessing speed of CDROM increases, the vibration problem due to acentric and high speed rotation thereof also increases. As a result, the data accessing is influenced and the user will feel uncomfortable. Therefore, a vibration-reducing device is required for the high-speed CDROM.

The conventional vibration-reducing device generally uses elastomer such as rubber or silicon rubber as hanging means between a weight body and the reading device to suppress vibration. However, the hanging means made of such elastomer has large variation in characteristics due to the difficulty in controlling the hardness and elastic constant (Young's modulus) of the elastomer materials. Therefore, the vibration-reducing effect is degraded and fail to meet the specifically-designed requirement. Moreover, the mechanical properties of the elastomer, such as elastic constant, hardness and damping ratio, are highly thermally dependent. The designed parameters of the hanging means even has great variation over an ordinary environment (5° C.~60° C.), thus degrading the vibration-reducing effect.

It is an object of the invention to provide a vibration-reducing device, wherein metal wire or metal plate is used to replace the elastomer member as hanging means between the weight body and the reading device The mechanical properties of metal materials have a great similarity over the different batches of product such that metal materials are advantageous to use as hanging means between the weight body and the reading device. Moreover, the mechanical properties of metal materials are less thermally sensitive in ordinary environment (5° C.~60° C.), thus providing enhanced stability.

The various objects and advantages of the present invention will be more readily understood from the following detailed description when read in conjunction with the appended drawing in which:

DETAIL DESCRIPTION OF THE PREFERRED EMBODIMENT

Figure 1:
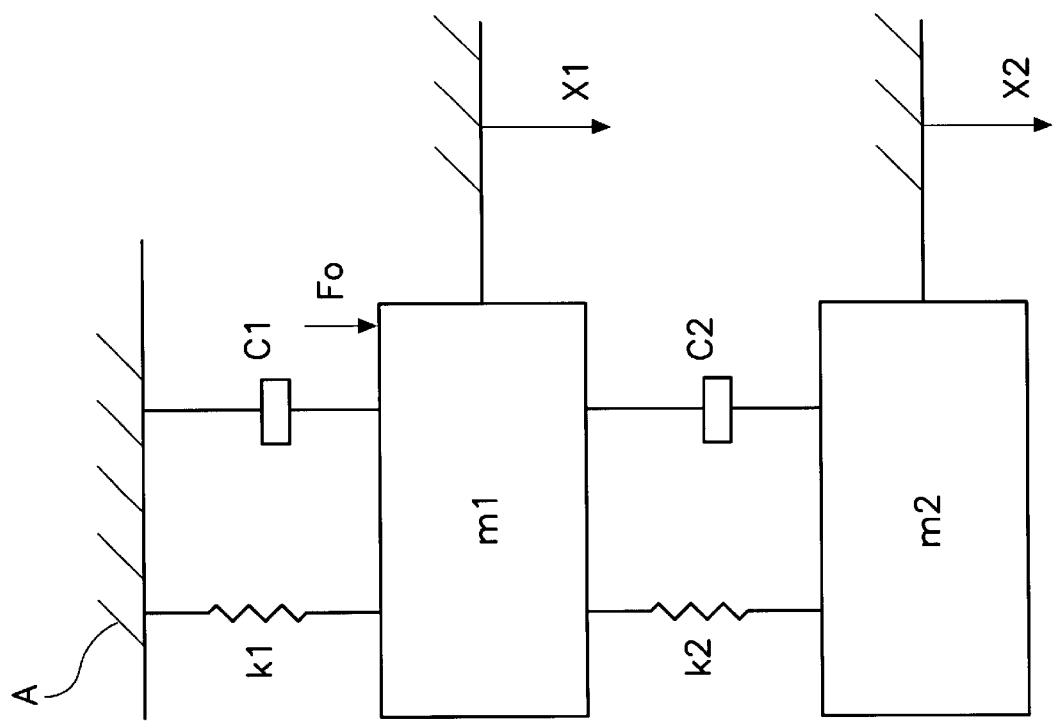
FIG. 1 shows the model of spring-mass system for the present invention.

As shown in FIG. 1 the principle of the vibration-reducing device of the present invention can be explained with reference a model of spring-mass system, wherein A denotes the housing of the reading device, m1 the mass of the reading device, m2 the mass of the weight body, $k_1$, $C_1$ the elastic constant and damping constant of the hanging means between the reading device and the housing, $k_2$, $C_2$ the elastic constant and damping constant of the hanging means between the reading device and the weight body, $F_0$ the centrifugal force of the reading device and $\omega$ the angular speed of the disk.

The high-speed CDROM is generally designed to operate in constant angular speed and $k_2/m_2$ is designed to be square of the angular speed., i.e.

$$\omega^2 = k_2/m_2$$

The vibration of the reading device caused by the acentric disk will transfer to the weight body (m2) at the designed angular speed. The vibration of the reading device will be reduced by the transferring action.

Figure 2:
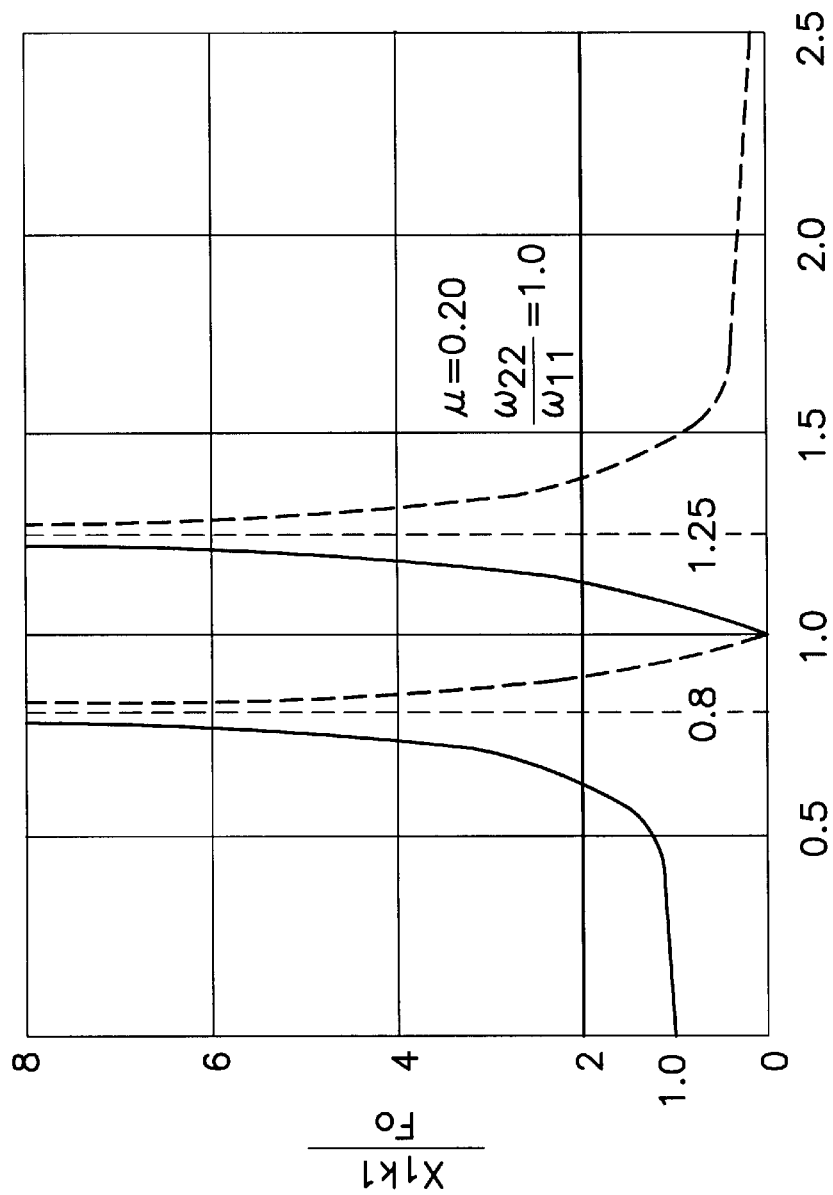
FIG. 2 shows the relationship between vibrational displacement and the angular speed of the optical disk to be accessed.

For sake of explanation provided that $C_1=C_2=0$ in above hanging means, the vibration $X_1$ of the reading device can be expressed as $$\frac{X_1 k_1}{F_0} = \frac{\left[1 - \left(\frac{\omega}{\omega_{22}}\right)^2\right]}{\left[1 + \frac{k_2}{k_1}\left(\frac{\omega}{\omega_{11}}\right)^2\right]\left[1 - \frac{k_2}{k_1}\left(\frac{\omega}{\omega_{22}}\right)^2\right]}$$

wherein $\omega_{11}^2 = k_1/m_1$, and $\omega_{22}^2 = k_2/m_2$. The vibration of the reading device is zero when the angular speed of the disk is the designed value, i.e., $\omega/\omega_{22} = \omega_{disk}/\omega_{22} = 1$. FIG. 2 shows the variation of $X_1 k_1/F_0$ with $\omega/\omega_{22}$ and provided that $u = m_2/m_1 = 0.2$ and $\omega_{22}/\omega_{11} = 1.0$. As shown in this figure, the vibration $X_1$ is very sensitive to $\omega/\omega_{22}$. The vibration-reducing effect will be degraded and the vibration is seriously increased, even if w slightly deviates from $\omega_{22}$. In other word, the parameters $k_2$ and $m_2$ should be well controlled to ensure the quantity $\omega_{22}$ ($=\sqrt{k_2/m_2}$). The present invention uses the fact that metal materials have stable thermal properties to keep $k_2$ at constant value for mass production.

Figure 3:
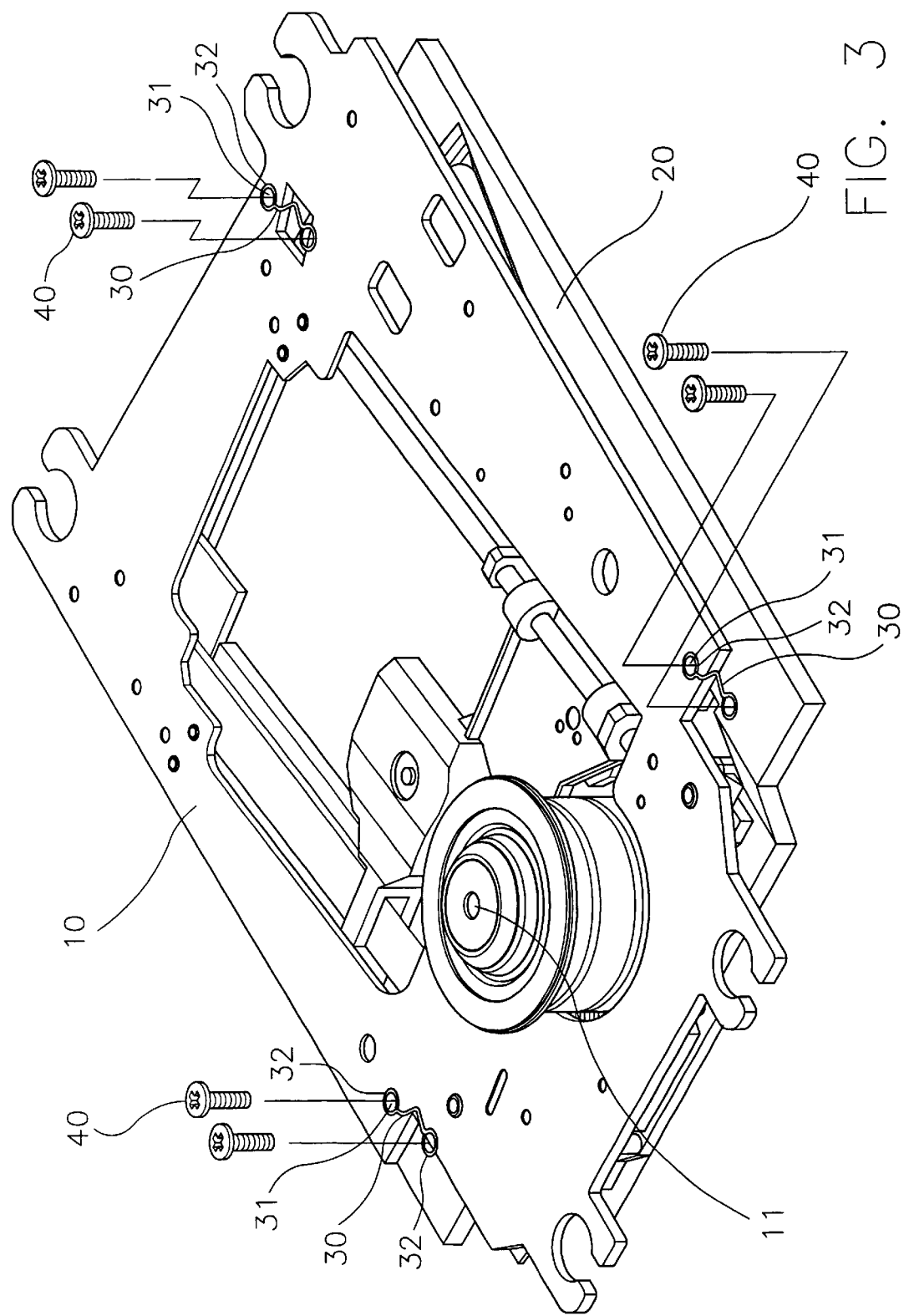
FIG. 3 is the perspective view of the invention.

As shown in FIG. 3, the present invention comprises a reading device, 10 and a weight body 20, where the reading device 10 comprises at least one disk rotating means 11 and the weight body can be any object with sufficient weight above or under the reading device. The present invention is characterized in that the conventional elastomer is replaced by metal wire or metal plate to function as hanging means between the reading device 10 and the weight body 20. The hanging means 30 can be fixed between the reading device 10 and the weight body 20 by screw 40.

Figure 4:
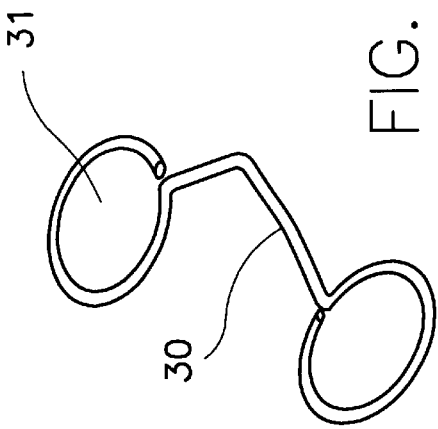
FIG. 4 is the perspective view of the first embodiment of hanging means in the present invention.
Figure 5:
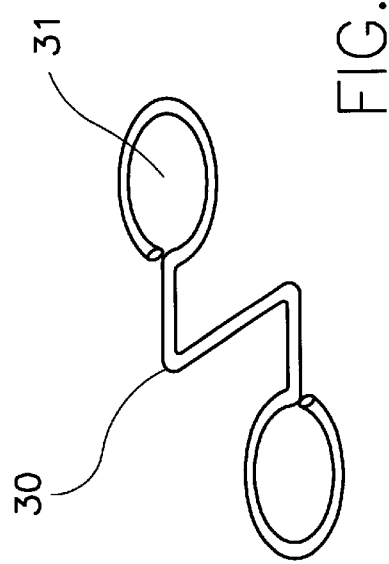
FIG. 5 is the perspective view of the second embodiment of hanging means in the present invention.
Figure 6:
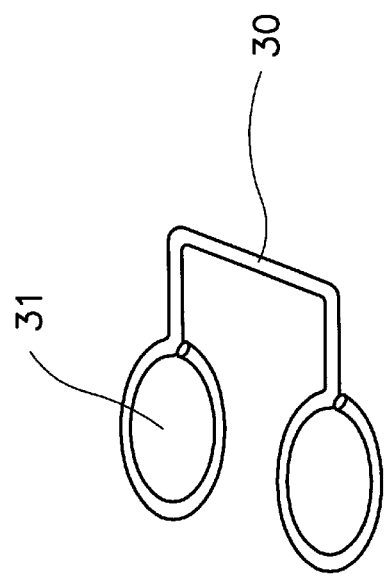
FIG. 6 is the perspective view of the third embodiment of hanging means in the present invention.

As shown in FIGS. 4 to 6, the hanging means 30 of the present invention is made of metal wire and can be bent to desired shape. Both ends of the hanging means 30 are bent to form loop 31 such hat the hanging means 30 can be fixed between the reading device 10 and the weight body 20 by screw 40.

Figure 7:
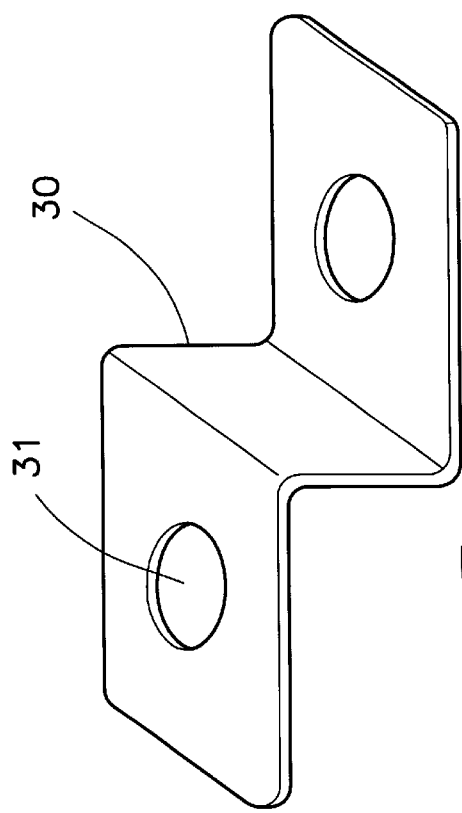
FIG. 7 is the perspective view of the fourth embodiment of hanging means in the present invention.

As shown in FIG. 7, the hanging means 30 of the present invention is made of metal plate and can be bent to desired shape. Both ends of the hanging means 30 are bent to form loop 31 defining a fixing hole 32 such that the hanging means 30 can be fixed between the reading device 10 and the weight body 20 by screw 40.

In the present invention, the mechanical properties of metal materials have a great similarity over the different batches of product such that metal materials are advantageous to use as hanging means between the weight body and the reading device Moreover, the mechanical properties of metal materials are less thermal sensitive in ordinary environment (5° C.~60° C.), thus providing enhanced stability.

Although the present invention has been described with reference to the preferred embodiment thereof, it be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A vibration-reduced disk drive system comprising:
   (a) a reading device including at least one disk rotating means for driving disk rotation;
   (b) a weight body disposed adjacent said reading device; and,
   (c) at least one hanging device formed of a metallic material joining said reading device and said weight body for transferring therebetween vibration due to disk rotation, said hanging device including first and second end portions coupled respectively to said reading device and said weight body and an intermediate portion extending therebetween;
   whereby the vibration of said reading device due to disk rotation is dampened by said hanging device and weight body.

2. The vibration-reduced disk drive system as recited in claim 1 comprising a plurality of said hanging devices.

3. The vibration-reduced disk drive system as recited in claim 1 wherein said intermediate portion of said hanging device is formed with a metallic wire configuration.

4. The vibration-reduced disk drive system as recited in claim 1 wherein said intermediate portion of said hanging device is formed with a metallic plate configuration.

5. The vibration-reduced disk drive system as recited in claim 4 wherein said intermediate portion of said hanging device includes at least one bend.

6. The vibration-reduced disk drive system as recited in claim 4 wherein each of said first and second end portions of said hanging device defines a fixing hole for engagement by a screw fastener.

7. A vibration-reduced disk drive system comprising:
   (a) a reading device including at least one disk rotating means for driving disk rotation;
   (b) a weight body disposed adjacent said reading device; and,
   (c) at least one hanging device formed of a metallic material joining said reading device and said weight body for transferring therebetween vibration due to disk rotation, said hanging device including first and second end portions coupled respectively to said reading device and said weight body and an intermediate portion extending therebetween, said intermediate portion having a wire configuration and including at least one bend.

8. A vibration-reduced disk drive system comprising:
   (a) a reading device including at least one disk rotating means for driving disk rotation;
   (b) a weight body disposed adjacent said reading device; and,
   (c) at least one hanging device formed of a metallic material joining said reading device and said weight body for transferring therebetween vibration due to disk rotation, said hanging device including first and second end portions coupled respectively to said reading device and said weight body and an intermediate portion having a wire configuration extending therebetween, each of said first and second end portions forming a loop defining a fixing hole for engagement by a screw fastener.

* * * * *